UNITED STATES PATENT OFFICE.

JONAS W. AYLSWORTH, OF EAST ORANGE, NEW JERSEY.

METHOD OF FORMING PHENOLIC CONDENSATION PRODUCTS.

1,047,484. Specification of Letters Patent. Patented Dec. 17, 1912.

No Drawing. Application filed March 11, 1911. Serial No. 613,916.

*To all whom it may concern:*

Be it known that I, JONAS W. AYLSWORTH, a citizen of the United States, and a resident of East Orange, in the county of Essex and State of New Jersey, have invented certain new and useful Improvements in Methods of Forming Phenolic Condensation Products, of which the following is a specification.

My invention relates to an infusible condensation product of phenol and formaldehyde, to articles molded therefrom or impregnated therewith, and to objects molded from a composition in which the binder is a fusible phenolic condensation product or a natural resin capable of being hardened by formaldehyde or an aldehyde derivative, or by a substance not an aldehyde but containing the methylene radical $CH_2$, such as hexa-methylene-tetra-amin, which radical is contained in formaldehyde.

My invention also relates to a method of forming an infusible phenolic condensation product or of treating molded objects above referred to, in order to render the same infusible. The method is also applicable to the formation of infusible coatings on fabrics, wires and coils for electrical apparatus and for the treatment of impregnated fabrics to render the impregnating substance insoluble and infusible and of high dielectric and mechanical strength.

The object of my invention is to provide an efficient process for producing an infusible phenolic condensation product as above referred to.

Other objects of my invention will appear more fully in the following specification and appended claims.

In my pending application Serial No. 493,259, filed May 1, 1909, entitled Method of forming articles of non-plastic resinized phenols, I have disclosed broadly the idea of forming objects of non-plastic resinized phenols by heating a liquid phenol or equivalent body, while forcing formaldehyde gas into the same, in a chamber which has an anhydrous salt therein or in communication therewith to absorb water formed by the reaction.

My present invention is a substantial improvement over the invention of the application referred to and permits quicker accomplishment of the hardening reaction through greater thicknesses of the mass exposed to the action of formaldehyde gas and without the evolution of water vapors or the necessity of absorbing the same in the chamber.

My present invention also discloses a composition specifically designed for high dielectric strength and other physical properties, such as flexibility, and non-corrosive action on the fabrics, metals, or other substances used in conjunction therewith. By one form of my invention I produce a composition which is infusible, but flexible or yielding both in the heated and cold state and which may be bent or twisted to a considerable extent without breaking or cracking.

My invention is practised, briefly speaking, by causing a fusible phenolic condensation product or phenol resin to absorb the gas or vapor of a substance, such as formaldehyde, which reacts upon the application of a sufficient amount of heat with the phenol resin to transform the same into an infusible product. The resin is preferably completely dehydrated and preferably has incorporated therewith a solid solvent or plasticity agent, which for purposes of electrical insulation, should also be anhydrous. After the gas has been absorbed by the resin to a sufficient extent, the mass is heated sufficiently to cause the desired reaction to ensue.

For coating or impregnating objects or forming insulating material, various methods may be used having certain objections, my present invention being in many respects an improvement upon all of them. As to these other methods, coils and the like may be impregnated with a varnish solution in a volatile solvent, the varnish comprising a mixture of a fusible phenolic condensation product or resin and a hardening agent for the same, such as formaldehyde or hexa-methylene-tetra-amin, the varnish being dried and heated to harden the mass. Such a process, however, is objectionable for some uses, because, except when in thin layers, the composition must be dried for a considerable length of time to remove the volatile solvent. Secondly the object may be dipped in or coated with a composition such as described in my application Serial No. 496,060, filed May 14, 1909, the composition comprising a molten mixture of a fusible phenol resin and a hardening agent, such as formaldehyde, which is subsequently hardened by sufficient heat. Such a process is open to objection, however, if the mass is to be maintained continuously in melted condition, while various objects are dipped in or impregnated with the same, because there is danger of reaction ensuing to some extent before the composition is wholly used, and the mass consequently hardened and wasted. According to another method, which is known in the art, the object may be impregnated with a mixture containing a phenol and an aldehyde in such proportions that a hard infusible product may be formed *in situ* by the application of heat and pressure. If this is done, a part of the large quantity of water eliminated during the reaction becomes imprisoned in the mass and impairs the insulating qualities of the product, and the reaction mixture, which is corrosive, weakens the fabric impregnated, or corrodes the metal coated with the composition. The same objection holds good, although to a somewhat less degree, when the impregnating substance is a partial reaction product of a phenol and formaldehyde, such as the liquid partial reaction product known in the art, which is hardened and rendered infusible by the application of heat and pressure without the addition of a further amount of formaldehyde or other hardening agent. The present invention eliminates all of the defects and difficulties described above and enables me to make a product which greatly advances the art of insulation and of molded objects designed to be used as insulators.

In practising my invention, I first form a fusible phenol resin such as described in my application Serial No. 496,060 referred to, or an equivalent substance capable of being rendered infusible by formaldehyde or other methylene-containing agent may be used. I prefer to use the phenol resin described in my application Serial No. 496,060, and referred to in my Patent No. 1,020,593, granted March 19, 1912, entitled Phenolic condensation product and method of preparing the same, which resin contains no free formaldehyde and no free phenol or but a slight quantity of phenol, and which cannot be rendered infusible by heating at any temperature without the addition of formaldehyde or other methyleneating agent. This fusible product or equivalent phenolic resin used is preferably completely dehydrated by heating the same in open vessels to a sufficiently high temperature, such as 420 degrees F. This treatment removes all of the free water and the chemically combined water of the resin and the greater part of the free phenol when the same is present in the resin. I then mix this anhydrous product with a solid solvent such as those disclosed in my application and patent referred to above or others disclosed in my application Serial No. 604,982, filed January 27, 1911, entitled Plastic phenolic condensation product, or I may use other solid solvent elements to be described. The solid solvent used may be present in a wide range of percentages varying between 5% and 125% of the weight of the phenol resin. Among the solid solvents which may be used are some which heretofore, it has been found, were impracticable to use because of the high melting point of the same, which is above the reaction temperature of the mass when hardening, such as anthracene (tetra-chloro-phenylene-oxid), and higher chloro-naphthalenes.

When the mixture of the phenol resin and the solid solvent has been prepared, it may be melted and remelted any number of times and may be heated to 300 degrees F. or higher, without hardening to a non-fluid mass. The wood, fabric, coil, wire armature, or other objects may be coated or impregnated with the melted compound by well known methods, such as by ordinarily dipping for coating the object, or by a vacuum and pressure treatment for impregnation.

The objects after having been treated, are drained of surplus material and placed in a chamber which may be air tight. This chamber has in connection therewith a means for generating formaldehyde gas or vapor or equivalent thereof. The objects to be treated are preferably first exposed to the gas or vapor for a sufficient length of time to enable the gas to penetrate within the object, at a temperature lower than the reaction temperature, but sufficiently high to maintain the phenol resin mixture in molten condition and then submitted to a higher degree of heat to cause the desired reaction. I prefer to use a temperature of approximately 212 degrees F. during the first period in which the gas is being absorbed by the phenol resin and solid solvent mixture, which time may vary between one and twelve hours or more, depending upon the thickness of the mass being treated. The second period during which the reaction is ensuing may last from one to twelve hours during which time the temperature may be from 230 to 300 degrees F. or higher. The heat to be used depends upon whether the object being treated may be damaged by high heat or not. For cotton covered wires and other fabrics, it is preferable not to exceed 240 degrees F., but for metallic objects being coated, or when forming an object in an open mold, the heat may, with advantage, be increased to much higher temperatures, and the gas may be maintained under pressure. This treatment renders the mass infusible and hard. But when certain solid solvents are used, the mass becomes semi-hard or flexible, and infusible, by which latter term I intend it to be understood that the mass will not flow at any temperature, although it may soften and become more plastic or elastic by the application of heat. When certain solvent elements are used, as will be described, the resulting mass after the final reaction is somewhat flexible or yielding when cold, as well as when heated, so that a coil of wire, for example, coated with such a composition, can be forced into position within a metallic housing without developing cracks or breaking or injuring the insulation.

The formaldehyde gas is absorbed by the phenol resin mass and combines therewith, and the small amount of water which is formed by the reaction is absorbed by either the anhydrous solvent, when the solvent is an anhydrous acid, or by the anhydrous phenol resin itself, or by the final product. Absorption of the gas prior to reaction is facilitated by having a moderate pressure in the chamber. The gas may be generated by suitable generators as stated, or polymerized formaldehyde, such as tri-oxy-methylene, which is a solid anhydrous form of formaldehyde, may be placed in the chamber and formaldehyde gas generated from the same by heating, the amount of pressure being regulated by the amount of heat supplied.

It is preferable to remove the oxygen, that is to say, the air from the chamber before the formaldehyde gas is allowed to be absorbed by the mass. This may be done by forcing an inert gas or formaldehyde gas through the chamber.

It may be noted that a great advantage is obtained by the process I have described over nearly all known processes of hardening plastic material, in that the material expands somewhat during the operation, which prevents shrinkage cracks, and also tends to fill the voids of the plastic mass with a compact film. Condensation products ordinarily contract during the hardening reaction, but the product here described acts differently, as noted.

The nature of the solid solvent greatly affects the time required for the gas to penetrate a given distance within the mass. Eugenol, oil of cloves, amyl alcohol, anisol, chloro-phenols, chloro-cresols, naphthalene and chloro-naphthalenes and amins are particularly efficient. For a flexible infusible product, eugenol or oil of cloves or amyl alcohol may be used, either alone or in combination with other solid solvents. The combined solvents, if more than one is used, or the single solvent where only one of the substances referred to is used, may be nearly equal in weight to the phenol resin, when a flexible product is desired. Among the solid solvent elements which may be used, and which I have referred to in my previous applications above mentioned, are naphthalene and some of its derivatives, particularly the nitro and chloro derivatives, benzene derivatives, such as dinitro-benzene, stearic acid and anhydrid, ricinoleic and ricinelaidic acids and their anhydrids, benzoic and phthalic acids and their anhydrids and others. Such substances combine with the mass at the reaction temperature, remain in the same in solid solution or emulsion, both when the mass is hot and when it is cold, render the mass plastic when reheated, relieve internal stresses in the mass, and facilitate the complete interaction of the reacting ingredients at the reaction temperature by promoting the fluidity of the mass at such temperature. For the formation of an insulating composition, the solvent elements should preferably be anhydrous such as some of those specifically mentioned.

In the claims, the word "formaldehyde" when used, will be understood to include polymers and homologues of formaldehyde, or other substances which are equivalent thereto in the reaction, as stated, and the term "phenol resin" will be used to designate a fusible phenolic condensation product capable of being rendered infusible by admixture with a hardening agent, as formaldehyde, upon application of sufficient heat.

Having now described my invention, what I claim and desire to secure by Letters Patent is as follows:—

1. The method of forming an infusible phenolic condensation product, which consists in mixing together an anhydrous fusible phenol resin and an anhydrous solid solvent element, causing formaldehyde gas to penetrate the mass and be absorbed thereby, and heating the mass sufficiently to cause a reaction to ensue and the mass to be transformed into an infusible product, substantially as described.

2. The method of forming an infusible phenolic condensation product, which consists in causing a methylene containing substance in gaseous form to penetrate within and be absorbed by a fusible phenol resin, and heating the mass sufficiently to cause a a reaction between the said substance and resin to ensue, and the mass to be transformed into an infusible product, substantially as described.

3. The method of forming an infusible phenolic condensation product, which consists in causing formaldehyde gas to penetrate within and be absorbed by a mass comprising a fusible phenol resin, and heating the mass sufficiently to cause a reaction between ingredients of the mass to ensue and the mass to be transformed into an infusible product, substantially as described.

4. The method of forming an infusible phenolic condensation product, which consists in causing formaldehyde gas to penetrate within and be absorbed by a mass comprising an anhydrous fusible phenol resin, and heating the mass sufficiently to cause a reaction between ingredients of the mass to ensue and the mass to be transformed into an infusible product, substantially as described.

5. The method of forming an infusible phenolic condensation product, which consists in exposing a heated fusible phenolic resin to formaldehyde gas, and maintaining the heat of the resin at a temperature which is elevated but below that at which the resin and gas react, for a sufficient time for the gas to penetrate within the resin to any desired distance, and then raising the heat to reaction temperature and maintaining the same under heat and pressure until the reaction has ensued and the mass is transformed into an infusible product, substantially as described.

6. The method of forming an infusible phenolic condensation product, which consists in preparing a completely dehydrated fusible phenol resin containing no uncombined formaldehyde or other methyleneating agent, exposing the same to formaldehyde gas, while heated to an elevated temperature which is below the reaction temperature of the gas and resin, for a sufficient time for the gas to penetrate within the resin to any desired distance, and then raising the heat to reaction temperature and maintaining the same until the reaction has ensued and the mass is transformed into an infusible product, substantially as described.

7. The method of forming an infusible phenolic condensation product, which consists in preparing a completely dehydrated fusible phenol resin containing no uncombined formaldehyde or other methyleneating agent, exposing the same in a non-oxidizing atmosphere, to formaldehyde gas, while heated to an elevated temperature which is below the reaction temperature of the gas and resin for a sufficient time for the gas to penetrate within the resin to any desired distance, and then raising the heat to reaction temperature and maintaining the same until the reaction has ensued and the mass is transformed into an infusible product, substantially as described.

8. The method of forming an infusible phenolic condensation product, which consists in preparing a completely dehydrated fusible phenol resin containing no uncombined formaldehyde or other methyleneating agent, mixing the same with an anhydrous solid solvent element, exposing the mass to formaldehyde gas, while heated to an elevated temperature which is below the reaction temperature of the gas and resin for a sufficient time for the gas to penetrate within the resin to any desired distance, and then raising the heat to reaction temperature and maintaining the same until the reaction has ensued and the mass is transformed into an infusible product, substantially as described.

9. The method of forming an infusible flexible composition which consists in mixing together a fusible phenol resin and a large percentage of an oily organic solid solvent element, causing the mass to absorb formaldehyde gas, and causing a reaction between the said gas and the resin to transform the mass into an infusible but flexible product, substantially as described.

This specification signed and witnessed this 3d day of March 1911.

JONAS W. AYLSWORTH.

Witnesses:
DYER SMITH,
ANNA R. KLEHM.